US009140401B2

(12) United States Patent
Hoyle

(10) Patent No.: US 9,140,401 B2
(45) Date of Patent: Sep. 22, 2015

(54) ADJUSTABLE ASSEMBLY FOR PROVIDING ALL-TERRAIN SUPPORT TO TABLES AND OTHER STRUCTURES

(71) Applicant: Gary C Hoyle, Cumming, GA (US)

(72) Inventor: Gary C Hoyle, Cumming, GA (US)

( * ) Notice: Subject to any disclaimer, the term of this patent is extended or adjusted under 35 U.S.C. 154(b) by 0 days.

(21) Appl. No.: 13/889,093

(22) Filed: May 7, 2013

(65) Prior Publication Data

US 2013/0306806 A1 Nov. 21, 2013

Related U.S. Application Data

(60) Provisional application No. 61/643,415, filed on May 7, 2012.

(51) Int. Cl.

| | |
|---|---|
| ***F16L 3/00*** | (2006.01) |
| ***F16M 11/00*** | (2006.01) |
| ***B25H 1/04*** | (2006.01) |
| ***A47B 3/06*** | (2006.01) |
| ***A47B 9/16*** | (2006.01) |
| ***A47B 13/02*** | (2006.01) |
| ***B25H 1/06*** | (2006.01) |

(52) U.S. Cl.

CPC .................. *F16M 11/00* (2013.01); *A47B 3/06* (2013.01); *A47B 9/16* (2013.01); *A47B 13/02* (2013.01); *B25H 1/04* (2013.01); *B25H 1/06* (2013.01)

(58) Field of Classification Search

USPC .............. 248/121, 444.1, 458, 459, 460, 463, 248/464, 465, 125.8, 125.9, 127, 157, 421, 248/423, 425, 163.1, 164, 165, 166, 168, 248/170, 440, 440.1, 176.1, 177.1, 176.3, 248/188, 188.1, 188.2, 188.6, 188.7, 188.8; 182/186.3, 186.5, 153, 224

See application file for complete search history.

(56) References Cited

U.S. PATENT DOCUMENTS

| | | | | | |
|---|---|---|---|---|---|
| 2,794,688 | A | * | 6/1957 | Scott | 182/155 |
| 3,045,777 | A | * | 7/1962 | Dintelmann | 182/153 |
| 3,443,662 | A | * | 5/1969 | Thompson | 182/155 |
| 4,457,399 | A | * | 7/1984 | Breisch | 182/185.1 |
| 4,638,885 | A | * | 1/1987 | Frederick | 182/151 |
| 4,836,332 | A | * | 6/1989 | Henson | 182/155 |
| 4,890,693 | A | * | 1/1990 | O'Brien | 182/151 |
| 4,911,390 | A | * | 3/1990 | Flick | 248/168 |

(Continued)

*Primary Examiner* — Monica Millner

(74) *Attorney, Agent, or Firm* — McNees, Wallace & Nurick LLC

(57) ABSTRACT

An adjustable assembly with at least a pair of adjustable legs is used to stabilize a support element on a wide range of terrains. Each of the adjustable legs is engaged with a leg exchange bracket 13 that is adapted for and connected to a support element such as a sawhorse beam, a tabletop, or other leg-bearing support element. Each of the adjustable legs can be variably adjusted to adapt to height and other terrain surface variations so as to provide an essentially steady and generally level support surface. Once the desired adjustment is selected, the legs are locked. If the terrain changes or there is a need to transfer the support surface to another terrain, the legs can be readily unlocked, the position of one or more legs adjusted, and the lock(s) reengaged to provide a steady and generally level assembly on the changed terrain. The assembly can also be configured so that it can be reversibly engaged with a variety of work surfaces either by removal of the full assembly from the support surface, or removal of the legs from their respective leg exchange brackets. An assembly can be readily disengaged from a first support surface, and reengaged with a second support surface. The legs of the assembly are easily adjusted to allow for stacking and for ease of transport of the support surface.

17 Claims, 10 Drawing Sheets

(56) References Cited

U.S. PATENT DOCUMENTS

| | | | | | |
|---|---|---|---|---|---|
| 4,938,311 | A | * | 7/1990 | Combs | 182/155 |
| 4,966,341 | A | * | 10/1990 | Borsani | 248/165 |
| 5,007,502 | A | * | 4/1991 | Shapiro | 182/155 |
| 5,078,352 | A | * | 1/1992 | Brow | 248/166 |
| 5,101,932 | A | * | 4/1992 | Trudgeon | 182/129 |
| 5,119,903 | A | * | 6/1992 | Ulshafer, Jr. | 182/155 |
| 5,184,697 | A | * | 2/1993 | Crewe et al. | 182/153 |
| 5,247,976 | A | * | 9/1993 | Matthews | 144/287 |
| 5,377,779 | A | * | 1/1995 | Slapnicka | 182/153 |
| 5,404,962 | A | * | 4/1995 | Carter | 182/153 |
| 5,538,102 | A | * | 7/1996 | Yemini | 182/225 |
| 5,560,449 | A | * | 10/1996 | Smith | 182/153 |
| 5,908,182 | A | * | 6/1999 | Stang et al. | 248/188.2 |
| 6,059,071 | A | * | 5/2000 | Appezzato | 182/181.1 |
| 6,564,903 | B2 | * | 5/2003 | Krajec | 182/153 |
| 6,681,895 | B2 | * | 1/2004 | Virtue | 182/186.3 |
| 6,810,996 | B2 | * | 11/2004 | Rump | 182/186.5 |
| 7,172,053 | B2 | * | 2/2007 | Slavich | 182/153 |
| 2003/0047384 | A1 | * | 3/2003 | Blackwell | 182/153 |
| 2004/0124036 | A1 | * | 7/2004 | Ulshafter, Jr. | 182/153 |
| 2005/0045422 | A1 | * | 3/2005 | Remmers | 182/153 |
| 2010/0224446 | A1 | * | 9/2010 | Bulley | 182/153 |

* cited by examiner

Figure 3(e)
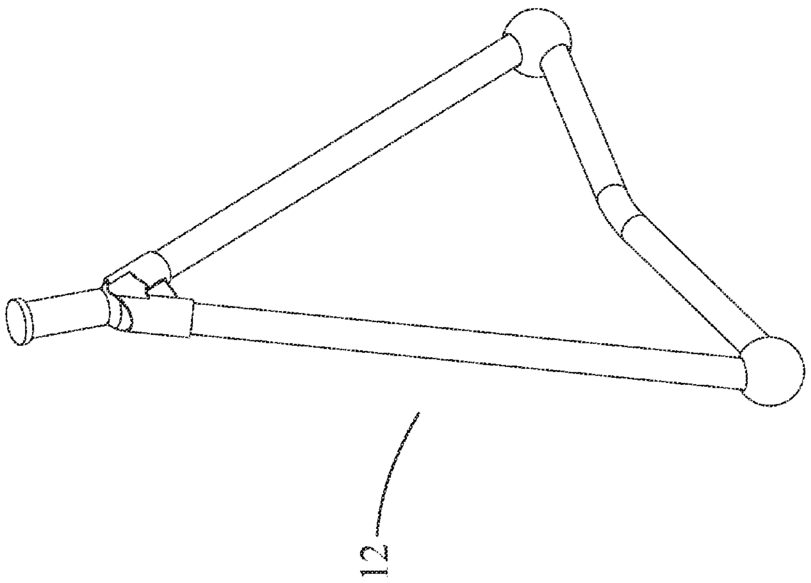
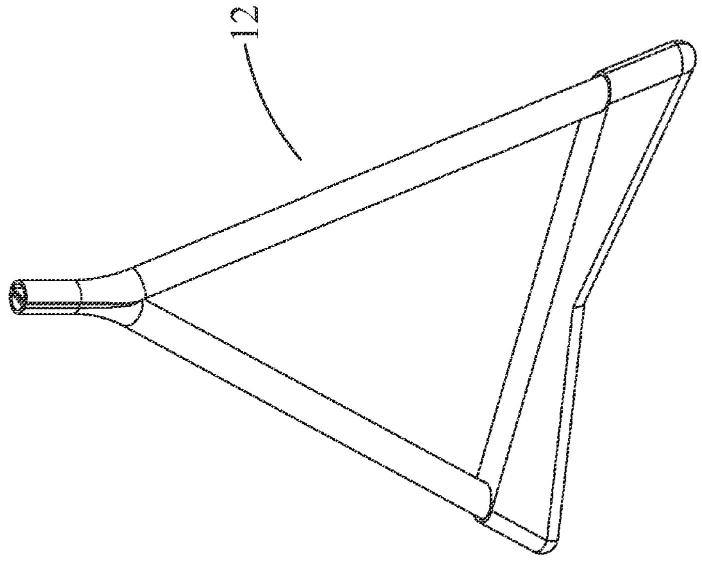
Figure 3(d)

ADJUSTABLE ASSEMBLY FOR PROVIDING ALL-TERRAIN SUPPORT TO TABLES AND OTHER STRUCTURES

CROSS-REFERENCE TO RELATED APPLICATION

This application claims the benefit of U.S. Provisional Patent Application Ser. No. 61/643,415, entitled ADJUSTABLE SUPPORT ASSEMBLY AND TABLE ASSEMBLY and filed May 7, 2012, the entire disclosure of which is incorporated herein by reference, to the extent that it is not conflicting with the present application.

BACKGROUND

Achieving a steady and level support surface has long been a challenge. Conventional support legs are static—they are not designed to be adjusted which means that the stability of the table or other rest or work surface relies on the contact points of the legs all resting on a single plane. If one or more of the legs of a support structure is not firmly contacting the underlying terrain, the support structure will be disposed to wobble, tilt or sway, thereby destabilizing the structure and throwing the support surface off level. Most people have experienced this problem with a wobbly café or picnic table that adversely affects the dining experience. Additionally, if the support structure is used for work that involves sawing or other reciprocating motions, the instability caused by uneven terrain combined with the vibrational motion can cause the support structure to migrate on the terrain and possibly overturn, causing unsafe conditions for the user and the work product. Finally, if one or more of the legs of a support structure is not firmly contacting the underlying terrain, then independent of the use of the support surface, the structural integrity of the support structure can be compromised, leading to structural damage and potential collapse.

A conventional sawhorse is one example of a work surface that can present danger to a user if it is not stable. The typical sawhorse assembly, which includes a horizontal beam as the support element, is typically made of wood, and two A-shaped legs formed from wooden boards, wherein the legs are attached to the beam in either a fixed or removable manner. The advantage to the typical sawhorse assembly is its robustness as a strong, durable support. But because a typical sawhorse assembly cannot be readily adjusted for adaptation to variable terrain, it may present a work surface that is ultimately unsteady and prone to tipping. Such instability presents hazards to both the user and the job-site work product, particularly when sharp and powered tools are being used. The static design of the sawhorse is also inefficient and cumbersome for purposes of portability and storage due to its overall shape. Indeed, because of its awkward shape and the attendant difficulty with storage and transportation, the sawhorse is often constructed and deconstructed on the job site.

There are many other instances where it is desirable or necessary to use a support surface on terrain that is not level or flat. Examples of other support surfaces that would benefit from more adjustable support assemblies include tabletops, chairs, work platforms, cooking surfaces, elevated storage containers, and other leg-bearing support surfaces that may be used on variable terrain. In one specific example, outdoorsman encounter widely variable terrain that that can make it difficult to achieve a safe and stable tabletop or other surface suitable for cooking, eating, cleaning fish, dressing game, gear maintenance and storage, and the like. And in yet other specific examples, campers and homeowners are challenged to achieve secure and generally level placement of outdoor tables and chairs.

Over time, numerous designs have been developed to address some of the deficiencies of table, sawhorse and other legs, including designs that employ one or more of telescoping, folding and twisting legs. While these designs can provide enhanced portability and storage, and enable achieving an improved level surface, such designs can suffer from compromised stability, lack of ease of use, and increased cost and complication in their manufacture.

Accordingly, there is a need for a support assembly that is able to provide adjustable and stable support for a variety of support elements, and is suitable for use on even and uneven terrain. There is also a need for such adjustable support assemblies that are easy to use, easy to store, modular to allow for adaptation of a variety of conventional support structures, and relatively simple and inexpensive to produce.

SUMMARY

The present application describes various exemplary adjustable support assemblies, modules, kits and methods for providing adjustable and stable support to a variety of work surfaces. Examples of work surfaces that can benefit from the below described assemblies include tables, chairs and other structures with three, four or more conventional legs, sawhorses, picnic tables and other structures that have two or more conventional A-shaped legs, tables and other surfaces that are supported by a pedestal, and yet other support surfaces that rely on one or more conventional legs or supports.

Exemplary embodiments of adjustable support assemblies include a support element, two or more legs, and corresponding leg exchange brackets, each adapted for attachment to a support element and a leg. In an exemplary embodiment, a leg includes a stem that is attached by insertion into a receiving portion of a leg exchange bracket, enabling the leg to rotate within the leg exchange bracket around an insertion axis. By differential rotation of each of the two or more legs within its corresponding leg exchange bracket, the user of the support assembly can adjust the elevation of ground contact points on the legs so as to accommodate varying terrain and uneven ground conditions. Rotation of the legs also permits the support assembly to be adapted to lie flat relative to the support element so that the entire assembly may be stored and transported more easily than in its erected state. Adjustment is achieved by actuation of a simple bolt, toggle or nut that is easily actuated without a tool and then lockable to ensure secure and stable fixation of the position of each leg.

In some exemplary embodiments, a support assembly may include a support element adapter, two or more legs, and corresponding leg exchange brackets, the support element adapter configured for engagement with the leg exchange brackets and adapted for interchangeable engagement with a variety of support elements using any suitable fastener. In some such embodiments, the support element adapter may include one or more braces or beams adapted for attachment with any suitable fastener to a support element.

Additional embodiments include a kit for providing replacement, supplemental or enhanced support to a conventional support assembly, such as a table, the kit including components selected from one or more horizontal braces or beams, one or more support element adapters, one or more legs and one or more leg exchange brackets, one or more leg and leg exchange bracket assemblies, one or more fixed (non-adjustable legs), selected fasteners suitable for connection of the components of the kit, and combinations of these.

Yet other embodiments include a tabletop or other support element adapted for receiving one or more of the horizontal braces or beams, legs, leg exchange brackets, leg exchange bracket assemblies, and fixed legs provided in the kits described herein.

Other aspects, features, and advantages of the various embodiments of the invention will become apparent with respect to the remainder of this document.

BRIEF DESCRIPTION OF THE DRAWINGS

Features and advantages of the general inventive concepts will become apparent from the following detailed description made with reference to the accompanying drawings.

FIG. 3(*a*) is a perspective view of the leg assembly; FIG. 3(*b*) shows a top plan view of the leg assembly.

FIGS. 3(*c*)-(*e*) show alternate embodiments of a planar triangular leg assembly of the adjustable support assembly embodiments disclosed herein. 3(*c*) shows a disassembled representation of a planar leg assembly as depicted in FIGS. 3(*a*) and 3(*b*) formed of modular rod components connected together with a proximal head and terrain feet connectors; FIG. 3(*d*) shows a planar leg assembly having tubular sides, a base and sides formed of a bent rod component connected with two spherical contact feet; and FIG. 3(*e*) shows a planar leg assembly having modular sides, and a unitary support base side with two socket connectors for receiving each of the sides.

FIG. 4(*b*) shows an alternate proximal portion of a leg assembly, wherein the proximal end of the leg is formed by compression of opposing ends of either side rods or a unitary tubular rod to form a substantially cylindrical insertion head which is adapted to be received into a proximal attachment stem.

FIG. 7(*b*) shows an alternate view of the adjustable support assembly shown in FIG. 1, wherein each of the legs is rotated into a position such that the plane of the leg is essentially parallel to a long axis of the beam support element (SA), and the plane of each leg is essentially parallel to the side plane of the support beam.

DETAILED DESCRIPTION

Figure 1:
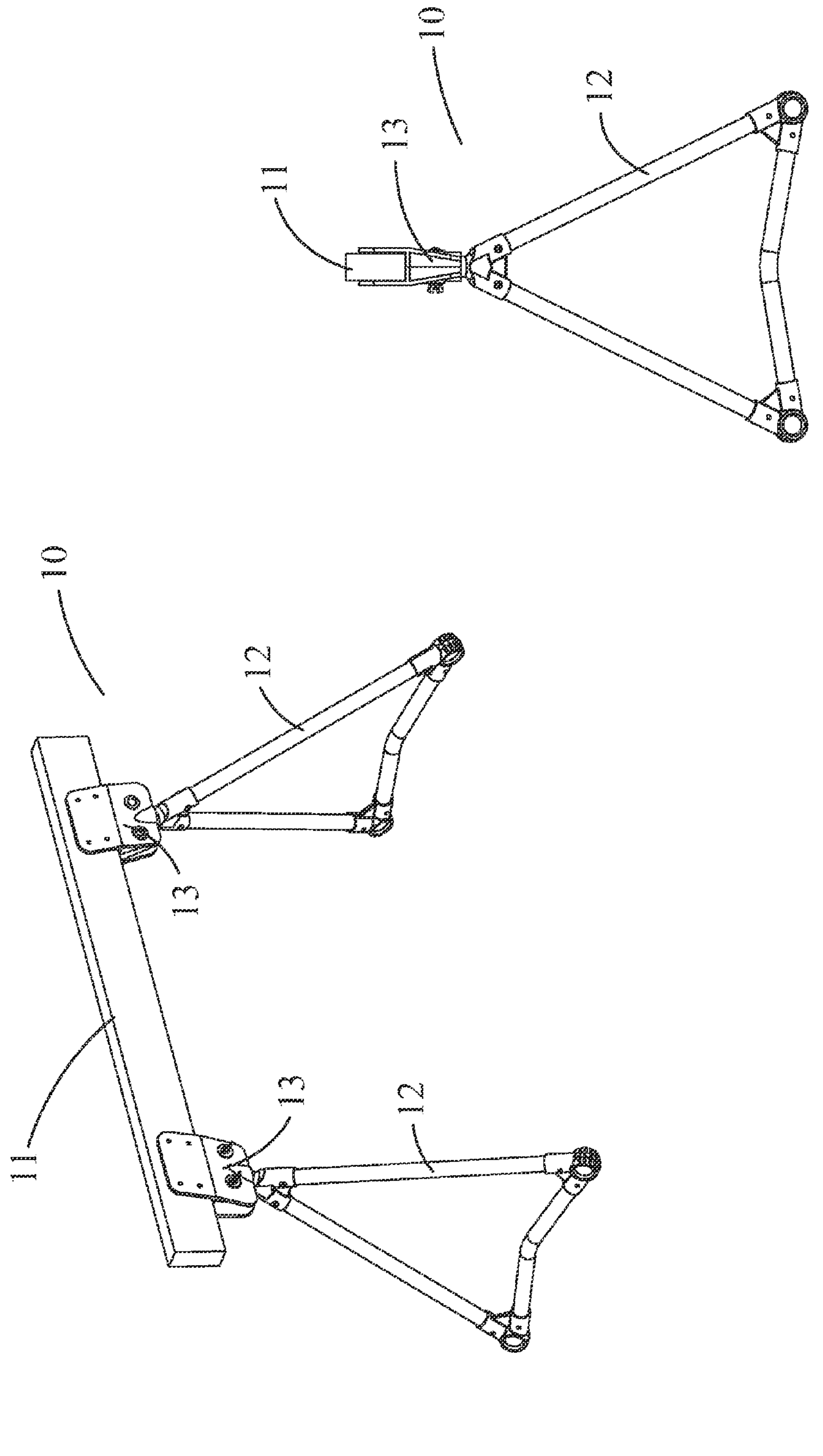
FIG. 1 shows, in separate panels, a perspective view of an adjustable support assembly according to an embodiment of the invention, wherein the assembly is in the form of a sawhorse with two planar triangular shaped legs, wherein each of the legs is rotated into a position such that the plane of the leg transects a long axis of the beam support element, and an end view of the same adjustable support assembly.

This Detailed Description merely describes exemplary embodiments in accordance with the general inventive concepts and is not intended to limit the scope of the invention in any way. Indeed, the invention as described in the specification is broader than and unlimited by the exemplary embodiments set forth herein, and the terms used herein have their full ordinary meaning.

The general inventive concepts will now be described with occasional reference to the exemplary embodiments of the invention. This general inventive concept may, however, be embodied in different forms and should not be construed as limited to the embodiments set forth herein. Rather, these embodiments are provided so that this disclosure will be thorough and complete, and will fully convey the scope of the general inventive concepts to those skilled in the art.

Unless otherwise defined, all technical and scientific terms used herein have the same meaning as commonly understood by one of ordinary skill in the art encompassing the general inventive concepts. The terminology set forth in this detailed description is for describing particular embodiments only and is not intended to be limiting of the general inventive concepts. As used in this detailed description and the appended claims, the singular forms "a," "an," and "the" are intended to include the plural forms as well, unless the context clearly indicates otherwise.

Unless otherwise indicated, all numbers expressing numerical ranges, and so forth as used in the specification and claims are to be understood as being modified in all instances by the term "about." Accordingly, unless otherwise indicated, the numerical properties set forth in the specification and claims are approximations that may vary depending on the suitable properties sought to be obtained in embodiments of the present invention. Notwithstanding that the numerical ranges and parameters setting forth the broad scope of the general inventive concepts are approximations, the numerical values set forth in the specific examples are reported as precisely as possible. Any numerical values, however, inherently contain certain errors necessarily resulting from error found in their respective measurements.

When discussing the invention, the terms "proximal" and "distal" are used relative to the position of the support element work surface, and not the ground. Thus, proximal means proximate or close to the support element and distal means distant from the work element and close to the ground.

The invention is directed to an adjustable assembly with at least a pair of adjustable legs that is used to stabilize a support element on a wide range of terrains. In some embodiments the adjustable assembly includes a support element, and in other various embodiments, the adjustable assembly is provided in one or more of modules and kits that are used with provided support elements or interchangeably with any of a variety of conventional support elements to provide a support assembly that is stable on a wide range of terrains. In the various embodiments, each of the adjustable legs is engaged with a leg exchange bracket that is adapted for and connected to a support element such as a sawhorse beam, a tabletop, or other support element or support element adapter. Each of the adjustable legs can be variably adjusted to adapt to height and other terrain surface variations so as to provide an steady and generally level support surface. Once the desired adjustment is selected, the legs are optionally locked. If the terrain changes or there is a need to transfer the support surface to another terrain, the legs can be readily unlocked, as desired, the position of one or more legs adjusted, and the lock(s) reengaged, as desired, to provide a steady and generally level assembly on the changed terrain.

Using one of the kits disclosed herein, the adjustable assembly can also be configured so that it can be reversibly engaged with a variety of work surfaces either by removal of the full assembly from the support surface, removal of the assembly from an support element adapter, removal of the legs from their respective leg exchange brackets, or combinations of these. Accordingly, an adjustable support assembly can be readily disengaged from a first support surface, and reengaged with a second support surface. According to the various embodiments, the legs of the assembly are easily adjusted to allow for stacking, storage and for ease of transport of the support surface.

Figure 2:
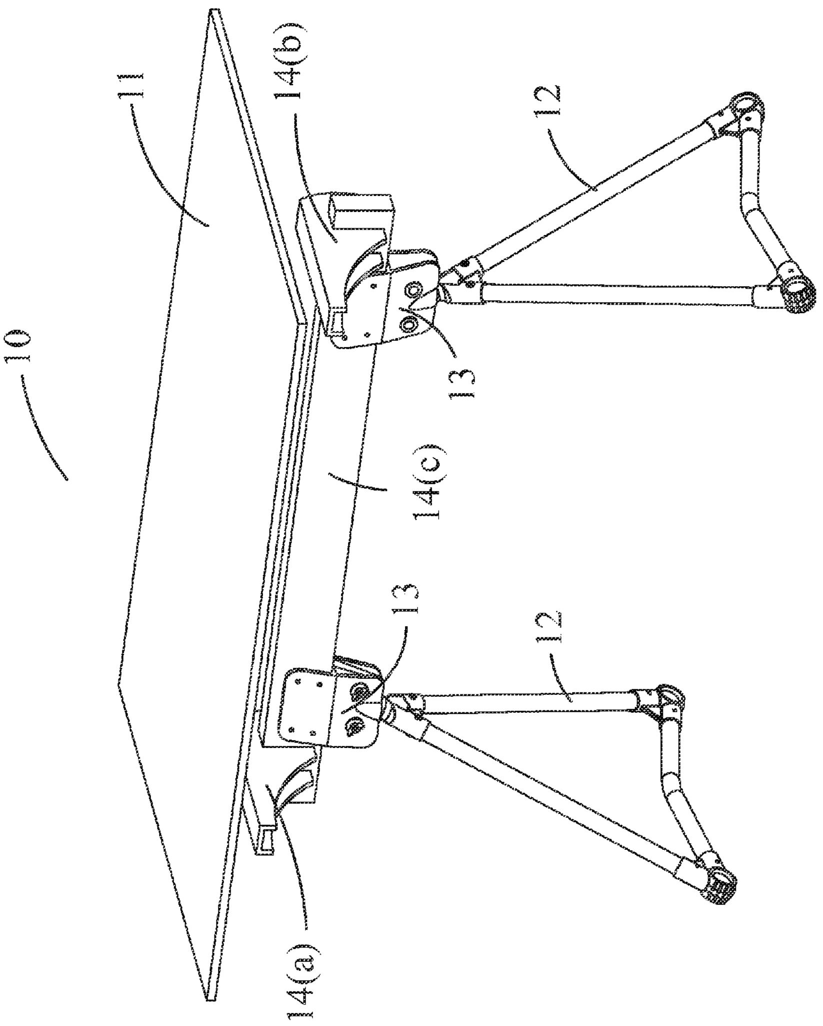
FIG. 2 shows a perspective view of an adjustable support assembly according to an embodiment of the invention, wherein the assembly is in the form of a rectangular table with two planar triangular shaped legs, wherein each of the legs is rotated into a position such that the plane of the leg transects a long axis of the table top support element.

Referring now to the drawings, FIG. 1 shows, in separate panels, a perspective view of an embodiment of an adjustable support assembly 10 comprising a sawhorse support element 11 and an end view of that same assembly. FIG. 2 shows a perspective view of an alternate to the embodiment shown in FIG. 1, wherein the support element 11 in FIG. 2 is a tabletop and the support element 11 is engaged with the assembly of the leg exchange brackets 13 and legs 12 by engagement with a support element adapter 14. Referring again to FIG. 1, the exemplary adjustable assembly 10 includes a support element 11, first and second legs 12, and first and second leg exchange brackets 13, each leg exchange bracket 13 adapted for engagement with a leg 12 and a support element 11, and further adapted to enable independent movement of each leg 12. Referring now to FIG. 2, in the alternate embodiment, the adjustable assembly 10 also includes a support element adapter 14, first and second legs 12, and corresponding leg exchange brackets 13, the support element adapter 14 configured to enable attachment of the leg 12 and leg exchange bracket 13 su assembly of the adjustable support assembly to any of a variety of support elements, such as the table top support element 11 shown. As depicted, the support element adapter 14 comprises two discrete adapter components 14(*a*) and 14(*b*) affixed at a distance apart from one another in a generally linear and parallel orientation on the underside of the support element 11 each of which is gripped to a beam element 14(*c*), to which two leg exchange brackets 13 are also attached. It will be appreciated that in alternate embodiments, a support element adapter may have a different form. For example, a support element adapter may be unitary and adapted to span the length of the underside of the support element 11. In yet other embodiments, a support element adapter may be unitary or modular and may be affixed to the underside of a support element in a circular or semi circular or other nonparallel configuration. And in yet other embodiments, a support element adapter may be configured to affix to more than one beam or rod elements that in turn can be connected to one or more leg exchange brackets. In all such embodiments, a support element adapter serves as a transitional component that enables modularity of the leg and leg exchange bracket subassembly to allow a user to construct a stable support assembly using standard construction materials or conventional support assemblies, and also allows a user to interchange the support sub assembly between support elements. A support subassembly comprises any two or more support assembly components selected from a support element, leg, leg exchange bracket, and support element adapter.

Some non-limiting examples of support elements include, sawhorse beams, tabletops, chairs, work platforms, portable cooking surfaces, grills, elevated storage containers, and other work surfaces that are supported by one or more feet or legs and provide support for any of a wide variety of uses, display or storage, each support element commonly sharing the requirement of maintaining a steady and generally level position for optimal use, and in some instances being defined by at least one substantially planar work surface. It will be readily appreciated that the nature, size and construction of a support element can vary widely, and that a support element can simply be and include any surface on which a user will use the surface to perform a task, store or display one or more objects. Accordingly, a support element may be any size, shape or length, it may be wide, or narrow such as a sawhorse beam, rod or pole, it may planar and have a square, rectangular, round or some other regular or irregular shape and may be essentially flat or dimensioned such as a cube or other form. Further a support element, as with each of the various support assembly components described herein, made be made of any material that is typically used for a support assembly, including but not limited to plastic, rubber, metal, wood, composites and combinations of any of these.

Again with reference to FIG. 1, in the depicted exemplary embodiment of the support assembly 10, a leg 12 has a substantially planar configuration and a generally triangular shape. In various embodiments, each of the at least two legs 12 has a configuration that is either planar or non planar and is shaped to provide stable support.

Figure 3B:
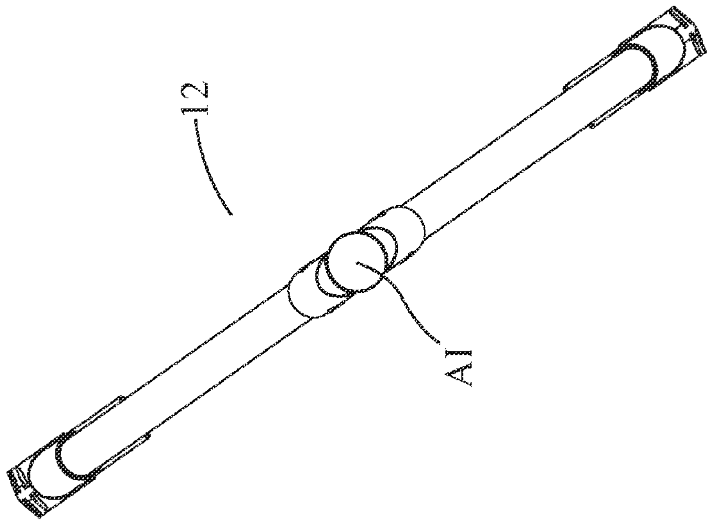
FIGS. 3(*a*) and (*b*) show alternate views and embodiments of a planar triangular leg assembly of the adjustable support assembly embodiments disclosed herein.
Figure 3A:
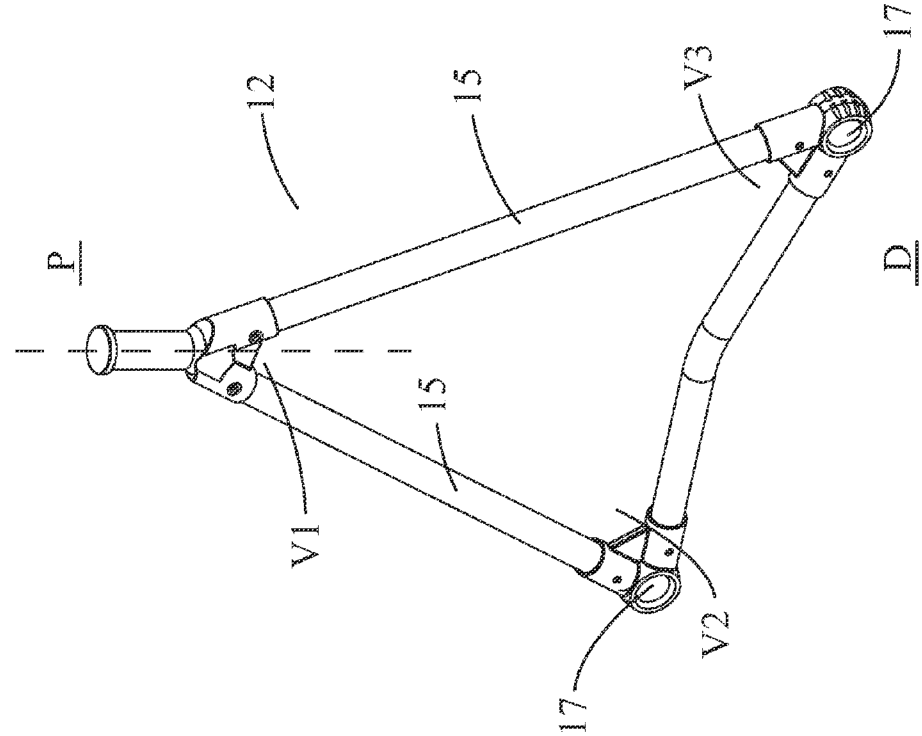
Figure 3C:
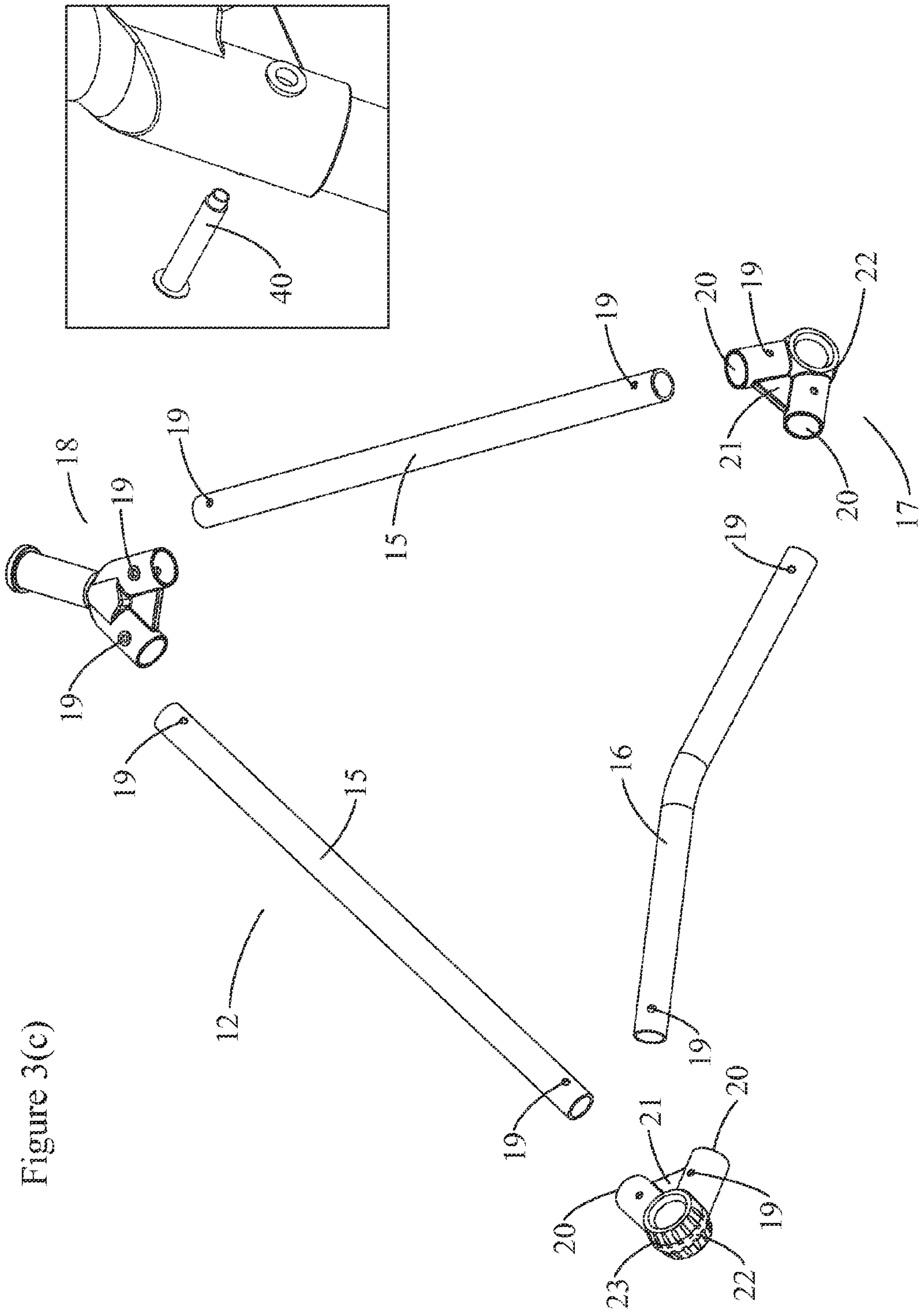

Referring now to FIGS. 3(*a*) and 3(*b*), a single leg 12 is depicted, which corresponds with a leg 12 of the exemplary embodiments depicted in FIG. 1 and FIG. 2. The leg 12 is a modular assembly, and as shown in FIGS. 3(*a*) and 3(*c*), forms a substantially planar and triangular shape. Referring now to FIG. 3(*c*), the leg 12 is depicted unassembled, and comprises three tubular rod elements including two elongate tubular side rods 15 and a shorter slightly arcuate tubular base rod 16 which are assembled by coupling at their ends to form a substantially triangular shape. In accordance with this exemplary embodiment, a leg 12 is adapted for attachment to a leg exchange bracket 13 at a proximal end P of the leg that is defined by one vertex V1 of the triangle, and is adapted for contact with the ground or terrain at a distal end D of the leg 12 that is defined by a base formed by two vertices of the triangle V2 and V3, each of which vertices V2 and V3 is a terrain-contact foot 17.

In other embodiments of the invention, rather than being modular in construction such as the leg 12 described above with reference to FIGS. 3(*a*)-(*c*), a leg 12 may be manufactured from a single element. In one such example, a leg 12 may be formed form a single length of rod that is bent to form a general triangular shape. It will be appreciated that in the various alternate embodiments, a leg may be formed from one, two, three or more elements, the elements may be circular, triangular or square in cross section, and may be solid or hollow or combinations thereof, such as, for example, plastic or metal pipes or solid rods, wooden, plastic or composite dowels, beams or boards, and telescoping rods and combinations of these. Further, the elements of leg assemblies according to the invention may be unitary and formed from a plate, or series of parallel or woven or cross-hatched wires or rods, baffles or other planar arrangement. Still further, a leg may be formed from conventional construction materials including but not limited to, metal, wood, compressed wood, composites, plastic, and combinations of any of these.

In some exemplary embodiments a leg 12 includes terrain-contact feet 17 that are attached to a leg 12 and positioned so as to contact the ground when the support assembly is erected. Referring again to FIGS. 3(*a*)-(*c*), a pair of terrain-contact feet 17 are shown attached to planar and triangular leg 12, wherein the terrain-contact feet are attached to each of the two vertices V2 and V3 at the distal end D of the leg 12. In some exemplary embodiments, the terrain-contact feet are formed of rubber or similar material and are textured, for example with treads or other structures that enhance traction when in contact with the ground. Referring now to FIG. 3(*c*), the depicted terrain-contact foot 17 is generally Y-shaped, and includes receiving sockets 20 for engagement with respective ends of tubular side rods 15, a central truss 21 for reinforcement, and a contact region 22 for contact with the ground, the contact region comprising raised ridges or treads 23 to facilitate gripping or traction with the terrain when the support assembly 10 is erected. In other embodiments, a terrain-contact foot 17 may be spherical in shape. It will be appreciated that any number of shapes and structures may be used for a terrain-contact foot, and may be elected as appropriate for optimal engagement with the terrain. It will be appreciated that in other embodiments wherein a leg has a different shape and configuration, there may be fewer terrain-contact points or more terrain-contact points and they may be positioned at vertices or at other positions relative to the body of the leg.

It will be appreciated that in alternate embodiments, the sides 15, base 16 and terrain contact feet 17 of leg assemblies according to the instant invention may have different configurations and shapes and may be formed of varying materials. FIGS. 3(*d*)-(*e*) show a variety of such alternate embodiments. FIG. 3(*d*) shows a planar leg assembly having tubular sides, a base and sides formed of a bent rod component connected with two spherical contact feet. FIG. 3(*e*) shows a planar leg assembly having modular sides, and a unitary support base in two possible forms each with two socket connectors for receiving each of the sides. In yet other possible embodiments, a leg assembly may be either of unitary construction formed of a single bent tubular rod having a contoured base with attached contact feet, or it may be modular and formed without a base and may include one or more struts or trusses for support.

In various embodiments, a leg may be unitary (that is, formed as a single piece), or modular (that is, formed of two or more pieces). In some embodiments, a substantially planar leg may have an A-shape or a V-shape, and in yet other embodiments a substantially planar leg may have a square or other polygonal shape. In yet other embodiments, a leg is non-planar and has any of a number of shapes, including but not limited to any one of an A-shape, V-shape and polygonal shape. In some embodiments, as shown in FIG. 1, the at least two legs 12 of an adjustable support assembly 10 all share the same shape and configuration, for example, a planar triangle. An adjustable support assembly may, of course, include three or more legs. And in yet other embodiments, each leg of an adjustable support assembly may differ in one or both shape and configuration. In some embodiments, a leg may be adapted for height adjustment, and in other embodiments, a selection of legs that vary in height may be used. In various embodiments, the legs 12 may be constructed of any of a variety of materials, including but not limited to, plastic, rubber, metal, wood, composites and combinations of any of these.

Figures 4A, 4B:
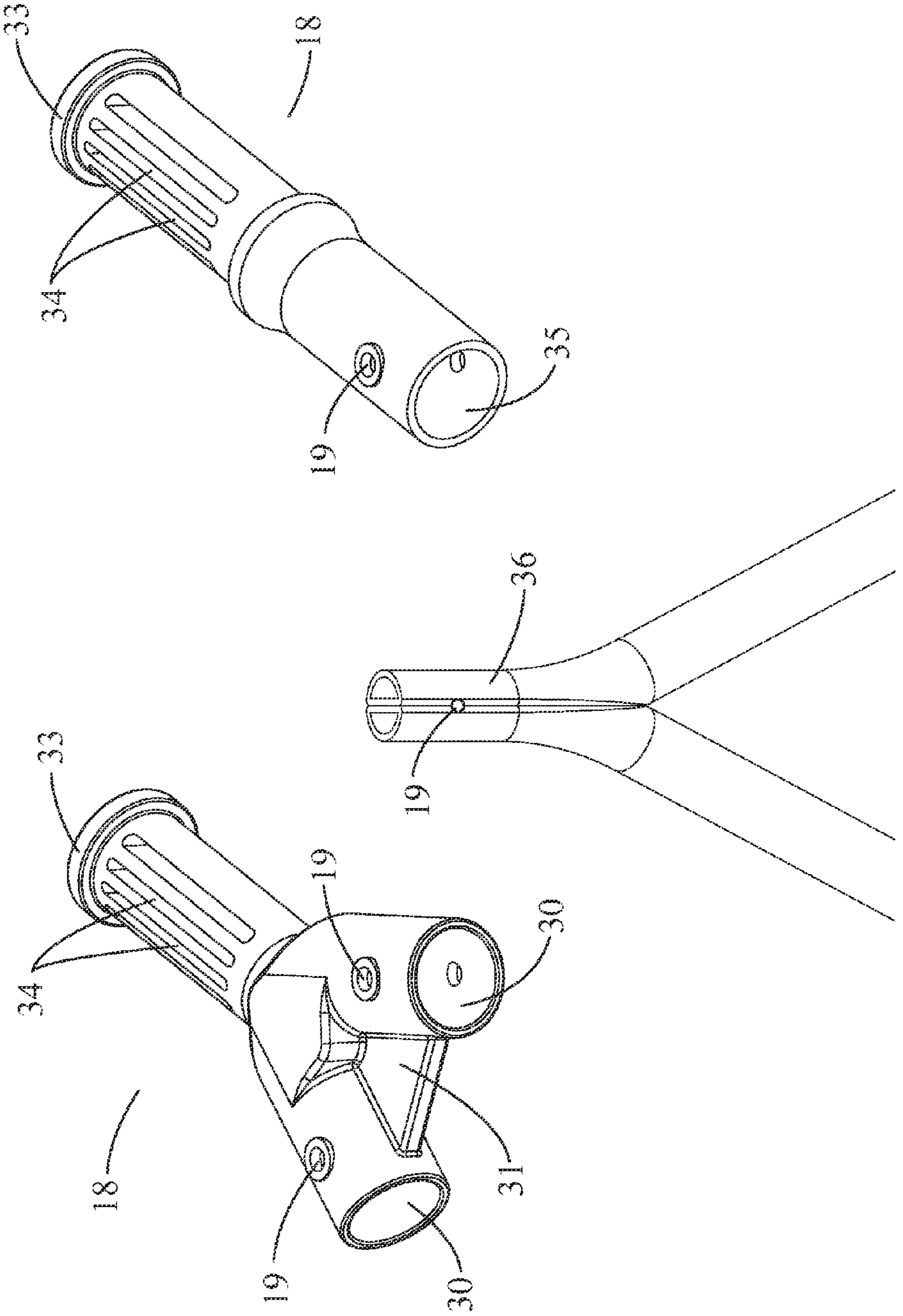
FIG. 4(*a*) shows an enlarged view of the proximal head portion of the leg assembly as shown in FIGS. 3(*a*)-(*c*) showing the detail of the proximal attachment stem.

Referring now to FIG. 4(*a*), in various embodiments, a leg 12 includes a proximal head 18 at leg 12 proximal end P for engagement of the leg 12 with a leg exchange bracket 13. The depicted proximal head 18 is generally Y-shaped and includes leg engagement sockets 30 for engagement with respective ends of rod elements 15, a central truss 31 for reinforcement, and an engagement stem 32. The engagement stem 32 comprises a locking flange 33, and one or more surface features 34, selected from but not limited to one or more of ridges, tracks, grooves, fins and ribs that enhance engagement of the stem 32 with the leg exchange bracket 13. In accordance with the various embodiments, the modular elements of a leg assembly may be connected by any of a number of fasteners well known in the art, including by welding, glue, screws, collets and other fasteners. In some embodiments, the fasters may be rivets. Referring again to FIG. 3(*c*), exemplary rivets 40 are shown. Referring again to FIG. 3(*c*), interfitting components of the leg assembly include through holes 19 that align upon engagement of the components with one another. A rivet is inserted through the aligned through holes and one or both of the rivet's ends are crimped to fix the rivet in place within the aligned through holes, thereby effectively locking the engaged components together.

As described further herein below, a proximal head 18 may have any of a number of other forms and configurations suitable for engagement with a leg exchange bracket. The embodiment shown in FIGS. 3(*a*)-(*c*) and FIG. 4(*a*) wherein the proximal head includes an engagement stem 32 attachment element is merely exemplary. FIG. 4(*b*) depicts one alternate embodiment. FIG. 4(*b*) shows an alternate proximal head portion 18 of a leg assembly, wherein the proximal head 18 is generally I-shaped and includes a receiving socket 35 for engagement with the ends of side rod 15 elements. Referring still to FIG. 4(*b*), in the depicted embodiment the insertion head 36 of the leg 12 is formed by compression of opposing ends of side rod 15 elements to form a substantially cylindrical insertion head 36 which is adapted to be received into the receiving socket 35 of the shown proximal head 18. The depicted proximal head 18 includes an engagement stem 32 of the same type as shown in FIG. 4(*b*). In yet another embodiment, the proximal head 18 portion of a leg 12 assembly may have a proximal head 18 that is generally Y-shaped and includes at least one receiving sockets for engagement with the end or ends of side rod elements wherein the attachment element is an engagement ball that has a generally spherical or hemispherical in shape and is receivable in a leg exchange bracket that has a corresponding concave spherical receiving socket that operates to receive and restrain the leg for axial rotation and adjustment as described in further detail herein below with respect to the general operation of various embodiments of the leg exchange bracket.

In various embodiments, each leg 12 is engaged in a support assembly 10 by attachment with a leg exchange bracket 13 that is adapted to provide engagement between a leg 12 and the support element 11 or support element adapter 14. Such engagement of a leg exchange bracket 13 with a support element or support element adapter 14 is achieved by use of one or more of screws, nails, bolts, clamps, rivets and other fasteners that enable rigid attachment, the attachment typically on the underside of a support element or to one or more of lateral faces of a support element or support element adapter. The mode of attachment of a leg exchange bracket 13 with a support element 11 may be either permanent or removable, and in some embodiments, a leg exchange bracket may be engaged with an intermediate structure that is itself connectable to a support element, such as a support element adapter or other fixture. A leg exchange bracket 13 is also adapted for engagement with a proximal end of a leg 12, and allows motion of the leg 12 in at least a rotational mode to enable positioning and repositioning of the attached leg, and optionally includes user actuated locking and unlocking.

Figure 5:
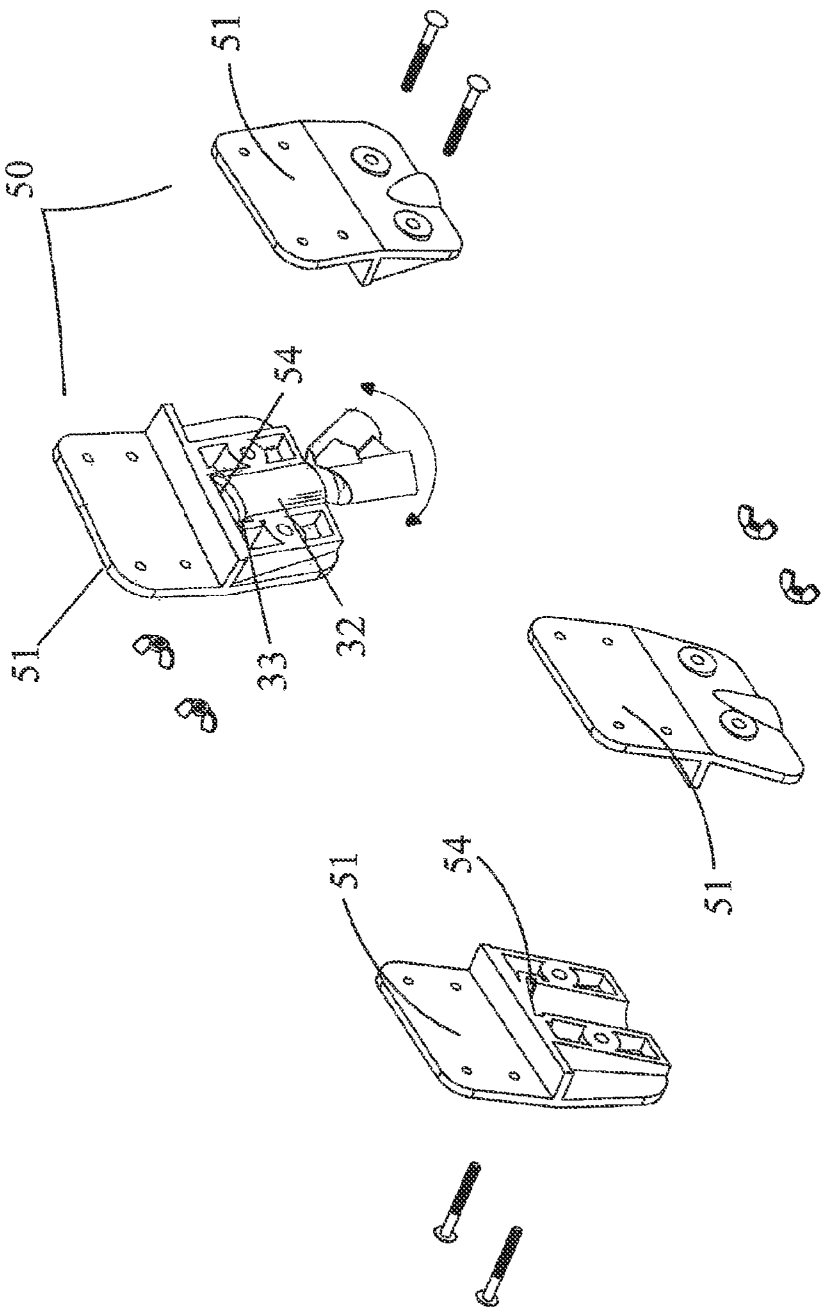
FIG. 5 shows an exploded view of an adjustable support assembly as shown in FIGS. 1 and 2 showing detail of one embodiment of a leg exchange bracket adapted for receiving a proximal attachment stem of a leg assembly, wherein the leg exchange bracket comprises a channel for receiving a stem, and wherein the flange formed at the end of the proximal attachment stem is shown rotationally engaging the locking ridge formed in the bracket.

Referring now to FIG. 5, a perspective view of an embodiment an adjustable support assembly 10 is shown with an exploded view of an embodiment of a leg exchange bracket 13 depicted. In use, the depicted leg exchange bracket 13 is fastened to the support element 11 using any suitable fastener, as described herein. According to the various embodiments, the leg exchange bracket 13 assembly comprises a bracket socket 50 element, which in the depicted embodiment comprises two joined leg exchange bracket plates 51. Each leg exchange bracket plate 51 is adapted for connection with a support element 11. The depicted leg exchange bracket plates 51 are adapted with fastener holes 52 for engagement with a substantially planar surface on the support element 11 and each leg exchange bracket plate 51 is configured to conform to the support element 11 at a first end and to couple together at a second end to receive and enclose a portion of a leg 12, such as an engagement stem 32. As shown in FIG. 5, the leg exchange bracket plates 51 couple to form a substantially cylindrical proximal head-receiving channel 53 for receiving a corresponding engagement stem 32. The proximal head-receiving channel 53 is adapted with an locking ridge 54 to receive and engage the locking flange 33 of the engagement stem 32.

In use, the engagement stem 32 is inserted into the receiving channel 56 along an axis of insertion AI such that the engagement stem 32 is rotatable in the leg exchange bracket 13 around the engagement stem's 32 central axis of insertion AI, and is prevented from pulling out of the channel 56 by interference of the flange 33 with the locking ridge 54. The leg exchange bracket 13 may be adapted with optional adjustable locking fasteners 41. Referring again to FIG. 5, the fasteners 41 are wing nuts that allow a user to variably lock and unlock the engagement of the engagement stem 32 within the stem-receiving channel 56. When fully locked, the surface features 34 of the engagement stem 32 interfere with the walls 57 of the stem receiving-channel 56 to lock the engagement stem 32 in place and prevent further rotation of the engagement stem 32, thereby locking the position of the leg 12 and fixing the position of the distal end D of the leg 12 such that the terrain contact feet 17 are fixed in position for optimal stable placement of the support assembly 10 on the terrain. When the locking fastener 41 is loosened, interference between the surface features 34 of the engagement stem 32 and the walls 57 of the stem-receiving channel 26 are relieved thereby enabling rotation of the engagement stem 32 to allow repositioning of the terrain contact feet 17 of the leg 12.

It will be appreciated that in various embodiments, the flange 23 and the locking ridge 54 may be adapted with pins, notches or other features which serve to limit the range of rotation of the engagement stem 32 within the channel 56, thereby limiting the range of rotation of the leg 12. In alternate embodiments of leg exchange bracket 13 assemblies according to the instant invention, the exchange brackets 13 may be adapted to receive the engagement portion of the proximal head 18 embodiments having differing geometry, such as for example spherical or semispherical forms wherein leg exchange bracket sockets 50 are configured with corresponding geometry to receive the proximal head engagement portions such as by snap fitting.

In various embodiments, the legs of an adjustable support assembly 10 are independently moveable in at least one mode, more particularly a rotational mode, whereby a leg can be rotated about a central axis of insertion AI that is defined by an attachment between the leg and the leg exchange bracket 13 such that the leg can rotate around the attachment axis within a range of at least one (1) degree to about 90 degrees to about 270 degrees and up to about 360 degrees.

Figure 6:
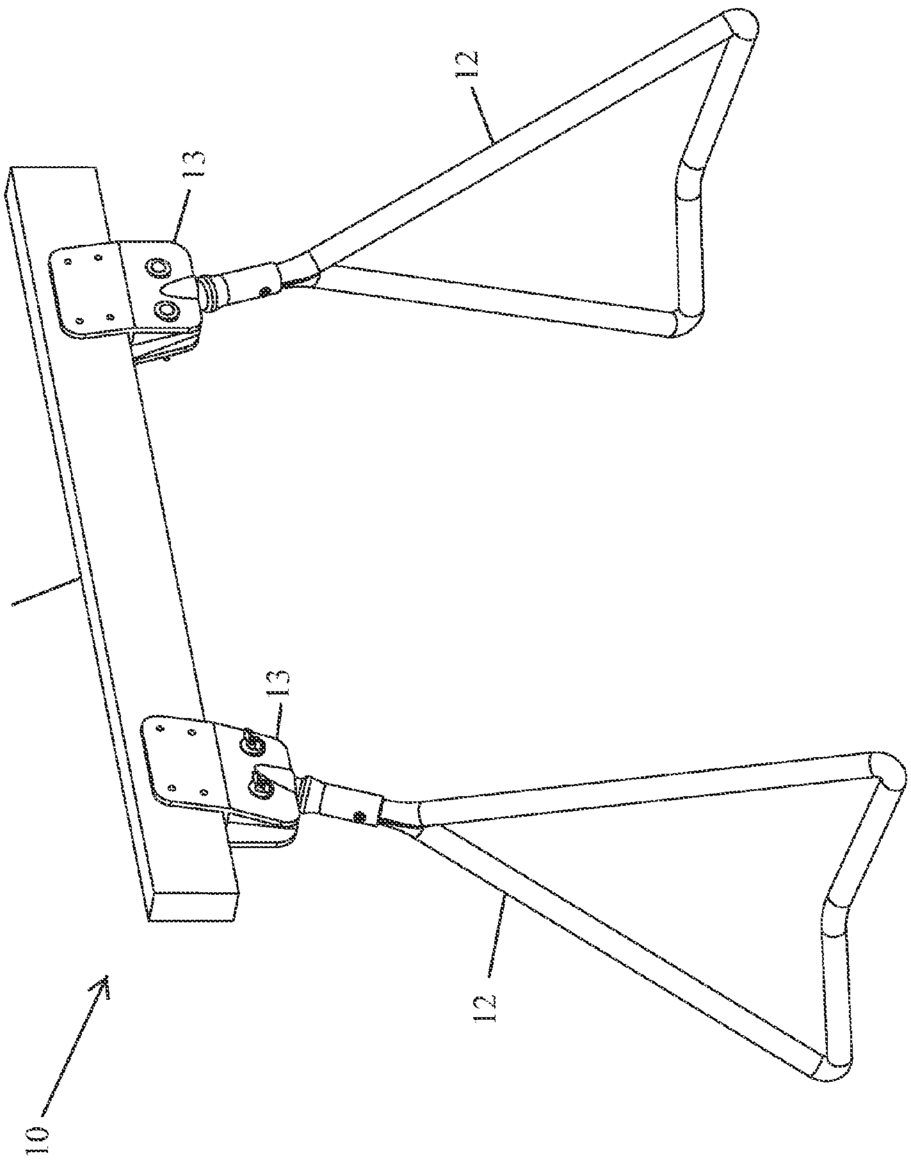
FIG. 6 shows a representative embodiment of an adjustable support assembly.

Referring now to FIG. 6, the depicted support assembly 10 is shown. In its rotational mode, a leg of a support assembly may rotate from any one of 90 degrees to 180 degrees to 270 degrees to 360 degrees, and any incremental degree there between. In a representative embodiment, the rotation of a leg in a leg exchange bracket 13 is 270 degrees. According to the depicted embodiment which comprises two legs, each having an AD of about 15 degrees, the assembly is placed on essentially level (planar) terrain, and each of the leg contact points share the same plane. If the terrain changes, then rotation of a leg from level will cause one contact foot to be elevated relative to the other foot, thereby enabling the selection of positioning of each leg that is optimal to achieve stability of the support assembly. The rotating mode of motion allows a user of the adjustable support assembly to independently adjust the elevation and positioning of the terrain-contact points of each leg with a simple, ergonomic motion to accommodate varying terrain conditions. This adjustability allows a user to achieve and maintain a safe and stable foundation on uneven ground surfaces, and provides a steady and generally level support work surface. It will be appreciated that in various embodiments, independent of the engagement means for the proximal head 18 of a leg 12 and the leg exchange bracket 13, rotation around the axis of insertion is in the range from zero (0) degrees to 360 degrees, and more particularly between 90 degrees to 270 degrees, and limitation on the range of motion between may be achieved by the use of pins, notches or other features that are positioned on each of the proximal head 18 and leg exchange bracket 13 to fix the range of rotation of the leg 12.

In some embodiments, the legs are movable in at least one other mode, for example a hinge mode, whereby a leg can be toggled between a fully extended and a fully retracted position along a path that is perpendicular to and intersects with the axis AI of rotation.

Figure 7A:
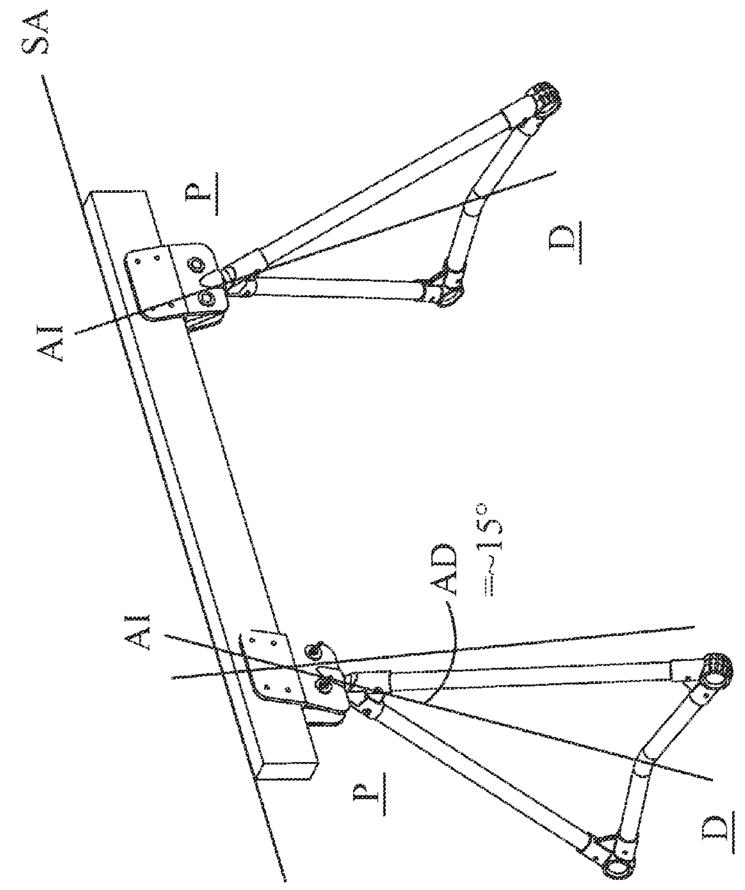
FIG. 7(*a*) shows an view of the adjustable support assembly shown in FIG. 1, wherein each of the legs is rotated into a position such that the plane of the leg transects a long axis of the beam support element (SA), wherein each leg is deflected outwardly, away from the center of the support structure and at an angle of approximately 15 degrees relative an axis that is perpendicular to the plane of the support surface.
Figure 7B:
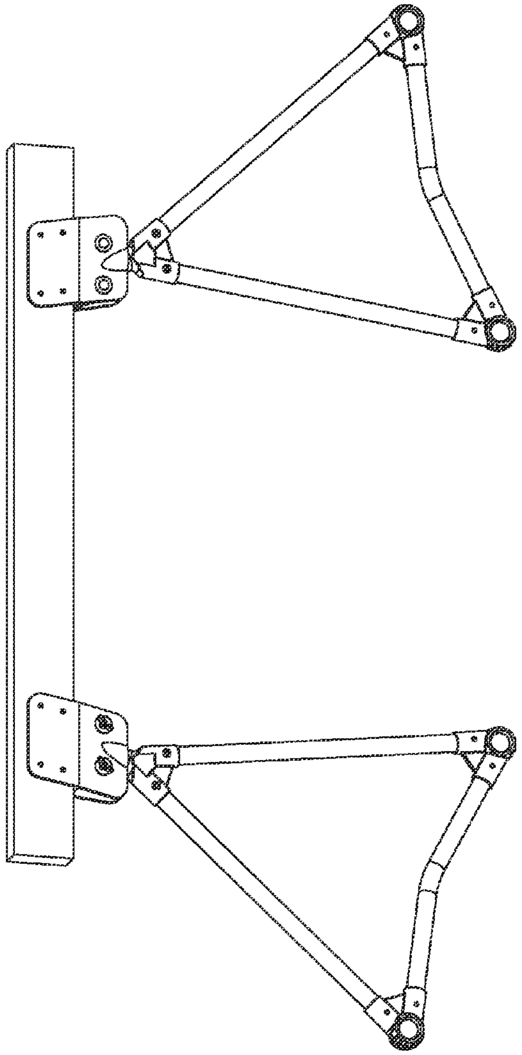

Referring now to FIG. 7(*a*), the depicted embodiment of the adjustable support assembly is shown deployed for use, wherein the work surface is a sawhorse comprising a beam support element 11. In the depicted embodiment, each of the legs is rotated into a position such that the plane of each leg transects a long axis of the beam support element (SA), each leg 12 is deflected outwardly, away from the center C of the support structure and at an angle of deflection AD that is approximately 15 degrees relative an axis that is perpendicular to the plane SP of the support surface, or expressed alternatively, is at an angle that is 75 degrees relative to the plane SP of the support surface. In accordance with various embodiments, the angle of deflection AD is optimally within the range from 0 to 20 degrees away from the vertical of the axis that is perpendicular to the plane of the support surface. As mentioned, the AD in the depicted embodiment is about 15 degrees, which is within a range from 12 degrees to 17 degrees that is ideal for achieving a wide range of adjustability for contact with the terrain while providing adequate support for the support assembly without risk of collapse. It will be appreciated that according to an embodiment (not shown) wherein the AD is zero (0) degrees, the axes of the legs 12 are parallel to the axis that is perpendicular to the plane SP of the support surface (that is, perpendicular to the SP). According to such embodiment, the legs 12 provide full support for the support assembly and are fully rotatable within the axis AI of insertion; however, the terrain contact feet 17 are essentially limited to a single plane. It will further be appreciated that at any angle of deflection AD that is greater than zero degrees and up to 90 degrees, wherein the axes of the legs 12 are not parallel with one another, the legs 12 will provide for the maximum range of adaptability to variable terrain.

It will be appreciated that stable positioning of a support assembly can be enhanced by use of terrain contact feet materials that are optimized both for the surface properties of the terrain and the degree of the angle of deflection that is desired in an assembly. This selection is particularly of value to enhance the gripping of the fit and to discourage slipping or migration of the support assembly on the terrain.

Referring again to the figures, FIG. 7(*b*) shows an alternate view of the adjustable support assembly shown in FIG. 1, wherein each of the legs is rotated into a substantially co-planar configuration allowing the assembly 16 to lie flat and be stackable for easy transport and storage. As shown, the plane of each leg 12 is essentially parallel to a long axis SA of the beam support element, and essentially parallel to the side plane of the support beam. It will be appreciated that these embodiments are merely representative, and are by no means limiting with respect to the support surfaces and support elements that can be adapted for adjustable positioning in accordance with the invention.

It will be appreciated that the components of the various embodiments of the adjustable support assembly are designed for modularity such that the benefits of the invention can be realized in fully assembled products such as tables, chairs, sawhorses and other assembled items that include the leg exchange bracket and leg assemblies disclosed herein for achieving virtually unlimited adjustability to level and stabilize the assemblies on variable terrain. The components are also ideally adapted for modular use so that sub assemblies of legs and leg exchange brackets can be used for interchangeable attachment to any of a variety of support elements, including existing conventional products such as tables, chairs and the like. Kits including the modular components allow a user to retrofit conventional items for enhanced adjustability and use. Various embodiments of such kits include: support element adapters that can be affixed to a support surface and are adapted for engagement with a support assembly; sub assemblies of legs and leg exchange brackets that may be assembled with support element adapters; sub assemblies of legs and leg exchange brackets that may be assembled and are adapted to be directly affixed to a support surface without a support element adapters; legs adapted for engagement with leg exchange brackets and available in a range of heights, sizes, shapes and foot styles for use on a variety of different surfaces; and other combinations of the elements disclosed herein.

While various inventive aspects, concepts and features of the general inventive concepts are described and illustrated herein in the context of various exemplary embodiments, these various aspects, concepts and features may be used in many alternative embodiments, either individually or in various combinations and sub-combinations thereof. Unless expressly excluded herein all such combinations and sub-combinations are intended to be within the scope of the general inventive concepts. Still further, while various alternative embodiments as to the various aspects, concepts and features of the inventions (such as alternative materials, structures, configurations, methods, devices and components, alternatives as to form, fit and function, and so on) may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the general inventive concepts even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A self-adjusting support assembly for use on uneven surfaces, comprising:
- (a) a support element;
- (b) at least one leg assembly positioned beneath the support element; and
- (c) at least one self-adjusting attachment assembly, wherein the at least one self-adjusting attachment assembly connects the support element to the at least one leg assembly, and wherein the at least one self-adjusting attachment assembly further includes:
  - (i) at least one bracket, wherein the at least one bracket is adapted to attach to the support element, and wherein the at least one bracket further includes:
    - a) a receiving channel formed therein, wherein the receiving channel is positioned along an angled axis of insertion, and
    - b) a locking ridge positioned in the receiving channel; and
  - (ii) a proximal head portion, wherein the proximal head portion is adapted to rotationally cooperate with at least one bracket and to receive the at least one leg assembly, and wherein the proximal head portion further includes:
    - a) a flange formed at one end thereof, wherein the flange rotationally engages the locking ridge;
    - b) a stem positioned beneath the flange, wherein the stem rotationally engages the receiving channel; and
    - c) a receiving portion positioned beneath the stem, wherein the receiving portion is adapted to receive the at least one leg assembly.

2. The assembly of claim 1, further comprising a support surface attached to the support element, wherein the support surface is perpendicular to the support element.

3. The assembly of claim 1, wherein the at least one leg assembly further includes multiple leg sections, and wherein the multiple leg sections are connected to one another in a triangular, planar configuration.

4. The assembly of claim 1, wherein the angled axis of insertion of the receiving channel is deflected outward from an axis that is perpendicular to a surface plane of the support element, and wherein the angle of deflection is between 2 degrees and 20 degrees.

5. The assembly of claim 1, wherein the angled axis of insertion of the receiving channel is deflected outward from an axis that is perpendicular to a surface plane of the support element, and wherein the angle of deflection is between 13 degrees and 17 degrees.

6. The assembly of claim 1, wherein the angled axis of insertion of the receiving channel is deflected outward from an axis that is perpendicular to a surface plane of the support element, and wherein the angle of deflection is 15 degrees.

7. The assembly of claim 1, wherein the at least one leg assembly can be rotated from 1 degree to 360 degrees around the angled axis of insertion.

8. The assembly of claim 1, wherein the at least one leg assembly can be rotated 180 degrees around the angled axis of insertion.

9. The assembly of claim 1, further comprising at least one locking element for preventing rotation of a leg assembly around the angled axis of insertion.

10. An adjustable support assembly of claim 1, wherein the leg exchange bracket is adapted to receive two legs of the leg assembly and wherein the leg exchange bracket is adapted for engagement with each leg such that the axis of insertion of each exchange bracket engagement socket is deflected from an axis that is perpendicular to the surface plane of the support element, and wherein the legs are deflected in opposing directions, such that the angle of deflection of one axis of insertion is the negative of the angle of deflection of the other leg.

11. The adjustable support element of claim 10, wherein the angle of deflection is between 2 degrees and 20 degrees.

12. The adjustable support element of claim 11, wherein the angle of deflection is from 13 degrees to 17 degrees.

13. The adjustable support element of claim 12, wherein the angle of deflection is 15 degrees.

14. The adjustable support assembly according to claim 13, further comprising a support element.

15. The adjustable support assembly according to claim 14, the support element selected from a table top and a wooden beam.

16. The adjustable support assembly of claim 10, wherein a leg can be rotated from 1 to 360 degrees around the axis of insertion.

17. The adjustable support assembly of claim 16, wherein the leg can be rotated 180 degrees.

* * * * *